C. G. Curtis.
Grain Drill.
No. 76,306. Patented Apr. 7, 1868.
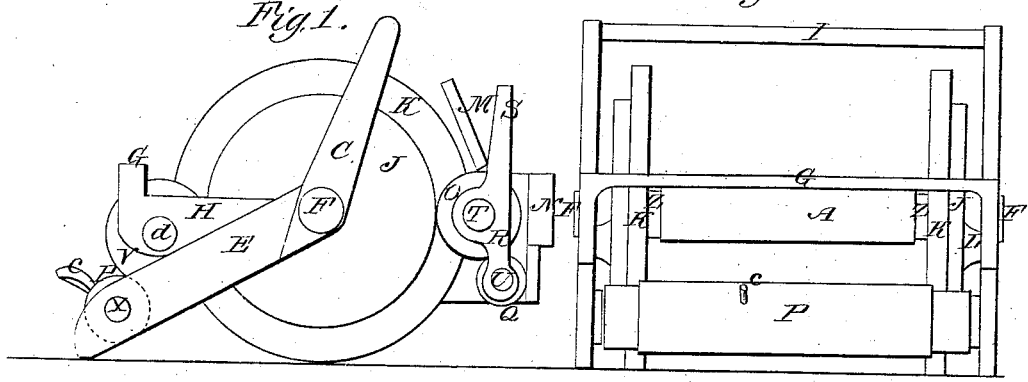
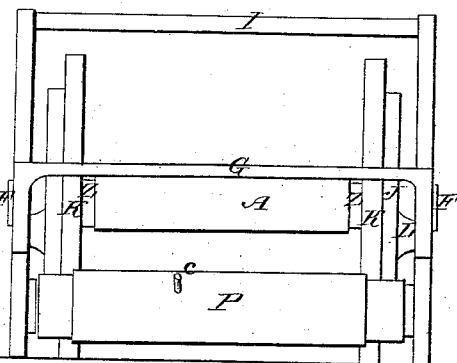
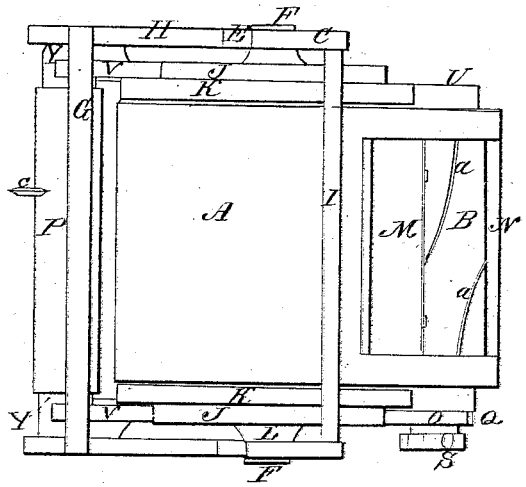
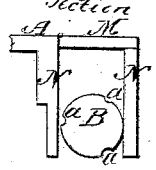
Witnesses.
Dwight Curtis
D. E. Judd.
Inventor
Charles G. Curtis
By his attorney
G. S. Chapin

United States Patent Office.

CHARLES G. CURTIS, OF PLANO, ILLINOIS.

Letters Patent No. 76,306, dated April 7, 1868.

IMPROVEMENT IN SEED-SOWER AND CULTIVATOR.

*The Schedule referred to in these Letters Patent and making part of the same.*

TO ALL WHOM IT MAY CONCERN:

Be it known that I, CHARLES G. CURTIS, of Plano, in the county of Kendall, in the State of Illinois, have invented an Improved Seed-Sower and Cultivator; and I do hereby declare that the following is a full and exact description thereof, reference being had to the accompanying drawings, and to the letters of reference marked thereon, making a part of this specification, in which—

Figure 1 is a longitudinal elevation of my invention.

Figure 2, a view of the rear of the same.

Figure 3, a top view.

Figure 4, a section of the seed-hopper and grooved roller for sowing grain.

Figure 5, a perspective representation of one of the cultivator teeth.

Figure 6, a transverse section of the same.

The nature of my invention consists in the arrangement of a spiral-grooved cylinder in a hopper at the front of the machine for distributing the seed on the ground, and elbow-levers pivoted to the ends of the axle, and made to extend above the machine to a convenient point for raising and lowering the cultivator, and to the rear of the machine for the support of a two-part roller working on a single journal, and having peculiar-shaped cutter-teeth for covering the seed and pulverizing the soil.

In order to give a correct understanding of my invention, I have marked similar parts with like letters, and will now give a detailed description.

K K represent common travelling-wheels, and Z, fig. 2, the axle on which they work. A carriage or box, A, is supported on said axle, and has a hopper, N, in which is hung a cylinder, B, having journals U passing through the ends of said hopper, one journal being long enough to pass through a pinion, Q, and lever R S, and arranged so that when the same is thrown to the front, using the long journal as an axis, the wheel O, fig. 3, hung to lever R S by a journal, T, fig. 1, will be put out of gear with the drive-wheel J, and thus stop the motion of the cylinder B. This cylinder has spiral grooves, $a\ a\ a$, made in its periphery, for the purpose of receiving the grain to be sown, and scattering it evenly on the ground, the hopper N being fitted closely to said cylinder to prevent any grain from falling through except what is carried by said grooves. C E represent elbow-levers, pivoted to the ends of the axle Z, fig. 2, secured in place by means of washers F, and made to extend upward to a convenient point for a driver, on the box A, to operate them by means of a rod, I, to which they are fastened. The rear ends of the levers are made to support a two-part roller, P, arranged to revolve on a journal, X, passing through it, and having bearings in the ends of said levers, and driven by means of pinions Y, attached to said roller, wheels V, having journals $d$ fastened to lugs H, rigidly attached to levers C E, and drive-wheels J attached to the travelling wheels K.

This arrangement of the roller I consider important, especially in the matter of convenience in turning the machine around, which can be done much more easily than if a single roller of the same length were used, as the parts of the roller shown will move in opposite directions, and thus cover the grain instead of scraping the surface of the ground. The roller P is to have such a number of teeth, $c$, fixed in its periphery as will thoroughly pulverize the soil and cover the seed. Only one, however is shown, which has the following-described shape, as seen in the enlarged drawings, figs. 5 and 6. $e$ represents the curved cutting-edge, and $g$ the back of the tooth, having a shank, $h$, for fastening it to the drum, and concaved sides $c\ c$, for giving a sharp edge, and yet permitting the back to be thick and strong for resisting obstructions.

The teeth can be made of iron or steel, as desirable, but I prefer the latter, as being much more durable, and the cheapest in the end. The roller P may be made of wood, with or without a covering of iron plate, according to the condition of the soil to be tilled; the other parts of the machine being made mostly of wood, except the gearing, which should be of iron, and made with cog-gear, not shown in the drawings, as its construction is well understood.

*Operation.*

The machine is supposed to move in the direction indicated by dart $t$, and the driver to sit in a seat fastened to box A, and in a convenient position to raise the roller P, which can be done by pushing forward on the rod I, this operation being necessary to carry said roller over obstacles, or to and from the field. The lever R S can be thrown forward and put the cylinder B out of gear, and secured in place, if need be, by any common catch used for a similar purpose in other machines.

Having thus described my invention, I claim, and desire to secure by Letters Patent of the United States—

1. The cylinder B, arranged with spiral grooves $a$ for distributing seed, substantially as and for the purpose set forth.

2. The tooth $c$, having a curved edge, $e$, convex back $g$, and concaved sides $c$ $c$, substantially as described.

3. The combination of the levers C E with the two-part roller P, arranged substantially as set forth.

CHARLES G. CURTIS.

Witnesses:
    DWIGHT CURTIS,
    D. C. JUDD.